(12) United States Patent
Dieterich et al.

(10) Patent No.: US 11,936,242 B2
(45) Date of Patent: Mar. 19, 2024

(54) ELECTRICAL MACHINE, GEAR MOTOR COMPRISING AN ELECTRICAL MACHINE, AND VEHICLE COMPRISING AN ELECTRICAL MACHINE

(71) Applicant: Valeo Siemens eAutomotive Germany GmbH, Erlangen (DE)

(72) Inventors: Sebastian Dieterich, Bad Neustadt a.d.Saale (DE); Bianca Hofmann, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 36 days.

(21) Appl. No.: 17/451,242

(22) Filed: Oct. 18, 2021

(65) Prior Publication Data

US 2022/0131428 A1 Apr. 28, 2022

(30) Foreign Application Priority Data

Oct. 22, 2020 (DE) ...................... 10 2020 127 829.2

(51) Int. Cl.
*H02K 1/20* (2006.01)
*H02K 5/15* (2006.01)
(Continued)

(52) U.S. Cl.
CPC .................. *H02K 1/20* (2013.01); *H02K 5/15* (2013.01); *H02K 7/006* (2013.01); *H02K 7/116* (2013.01);
(Continued)

(58) Field of Classification Search
CPC .............. H02K 1/20; H02K 5/15; H02K 9/19
See application file for complete search history.

(56) References Cited

U.S. PATENT DOCUMENTS 4,745,314 A * 5/1988 Nakano ................... H02K 9/197
310/216.127
5,220,233 A * 6/1993 Birch ................... H02K 1/2733
310/156.28
(Continued)

FOREIGN PATENT DOCUMENTS

DE 102013216738 A1 4/2014
DE 102018222355 A1 6/2020
(Continued)

OTHER PUBLICATIONS

German Search Report issued in corresponding German Application No. 10 2020 127 829.2, dated Aug. 13, 2021 (9 pages).
(Continued)

*Primary Examiner* — Dang D Le
(74) *Attorney, Agent, or Firm* — Osha Bergman Watanabe & Burton LLP

(57) ABSTRACT

Described is an electrical machine (1) which comprises two end shields (6, 7), a stator (5) which is arranged between the two end shields (6, 7) and has a stator laminated core (11, 11*a*) and stator windings (12) arranged therein, and a rotor (3) which is arranged in the stator (5) and has a rotor shaft (2) mounted rotatably in the two end shields (6, 7). The electrical machine (1) furthermore has cooling channels (13) arranged fully in the stator laminated core (11, 11*a*) and edged by the latter. Furthermore described are a gear motor (30) comprising such an electrical machine (1), as well as a vehicle (20) comprising such an electrical machine (1).

10 Claims, 3 Drawing Sheets

(51) Int. Cl.
*H02K 7/00* (2006.01)
*H02K 7/116* (2006.01)
*H02K 9/19* (2006.01)
*B60K 1/00* (2006.01)
*B60K 17/04* (2006.01)

(52) U.S. Cl.
CPC ............... *H02K 9/19* (2013.01); *B60K 1/00* (2013.01); *B60K 2001/005* (2013.01); *B60K 17/04* (2013.01)

(56) References Cited

U.S. PATENT DOCUMENTS

| | | | |
|---|---|---|---|
| 7,411,323 B2* | 8/2008 | Pfannschmidt | H02K 1/32 310/58 |
| 2006/0026820 A1 | 2/2006 | Rippel et al. | |
| 2013/0193786 A1 | 8/2013 | Cherney | |
| 2014/0265662 A1 | 9/2014 | Shoykhet | |
| 2015/0027273 A1* | 1/2015 | Iwase | B60K 6/48 74/665 B |
| 2015/0280525 A1 | 10/2015 | Rippel et al. | |
| 2017/0271955 A1 | 9/2017 | Hanumalagutti et al. | |

FOREIGN PATENT DOCUMENTS

| | | |
|---|---|---|
| EP | 2814139 A1 | 12/2014 |
| WO | 02/49193 A1 | 6/2002 |
| WO | 2012/003208 A2 | 1/2012 |
| WO | 2016/173812 A1 | 11/2016 |

OTHER PUBLICATIONS

Extended European Search Report issued in European Application No. 21202374.1, dated Mar. 25, 2022 (7 pages).

* cited by examiner

ELECTRICAL MACHINE, GEAR MOTOR COMPRISING AN ELECTRICAL MACHINE, AND VEHICLE COMPRISING AN ELECTRICAL MACHINE

TECHNICAL FIELD

The invention relates to an electrical machine, a gear motor comprising an electrical machine, and a vehicle comprising an electrical machine.

PRIOR ART

In electrical machines it is known to cool the stator in order to dissipate from the stator the waste heat that accumulates during operation of the electrical machine. In some systems cooling tubes are provided for this purpose in the stator, which cooling tubes are part of a cooling system and through which a heat transfer medium is passed. The cooling system may also comprise a pump for recirculating the heat transfer medium as well as a heat exchanger. A disadvantage of the known methods for producing a stator is that they are technically relatively complex and increase the cost of production of the electrical machine.

SUMMARY OF THE INVENTION

An object of the invention is therefore to describe an improved electrical machine, an improved gear motor, and an improved vehicle. In particular, it will be possible to cool the stator with a relatively lower technical outlay.

The object of the invention is achieved with an electrical machine which comprises
  a first end shield and a second end shield,
  a stator which is arranged between the two end shields and has a stator laminated core and stator windings arranged therein,
  a rotor which is arranged in the stator and has a rotor shaft mounted rotatably in the two end shields, and
  cooling channels arranged fully in the stator laminated core and edged by the latter.

In other words, cooling channels extend in the stator laminate core, the (circumferential) delimitation of which cooling channels is formed fully by the stator laminations of the stator laminated core.

The object of the invention is also achieved with a gear motor which comprises a transmission and an electrical machine of the aforementioned type coupled to the transmission, wherein a cooling and/or lubricating circuit of the transmission is hydraulically connected to the cooling channels of the electrical machine.

Lastly, the object is also achieved by a vehicle comprising at least two axles, of which at least one is driven, wherein said drive is provided at least partially or for part of the time by the above-mentioned electrical machine or by a gear motor of the above-mentioned type.

By means of the proposed measures, the disadvantages cited initially may be overcome. In particular, it will be possible to cool the stator with a lower technical outlay. In concrete terms, the cooling channels are defined directly by the stator laminations of the stator laminated core; no additional cooling tubes are provided. In other words, a cooling medium comes directly into contact with the stator laminations. Since the (circumferential) delimitation is formed fully by the stator laminations of the stator laminated core, a motor housing, which usually forms part of the (circumferential) delimitation of the cooling channels, can be spared. The electrical machine can therefore be constructed particularly easily and so as to be lightweight.

The cooling channels can thus be produced, for example, directly by stamping or cutting corresponding recesses into the individual stator laminations.

If the stator laminations are stacked one above the other, the cooling channels are thus created. If the stator laminations are not rotated when they are stacked, cooling channels are thus created, which extend in the axial direction, parallel to a rotational axis of the rotor shaft. If, by contrast, the stator laminations are slightly rotated relative to one another when they are stacked, a skewed position of the cooling channels is thus created, so that they extend helically around the rotational axis of the rotor shaft. The cooling channels are advantageously open only at end faces of the stator laminated core. The stator laminations can be identically shaped.

It is particularly advantageous if oil is provided as cooling medium, since this does not lead to corrosion of the stator laminations. For example, oil of a transmission to which the electrical machine is flange-mounted or in which the electrical machine is installed, can be used as cooling medium. Waste heat from the electrical machine and also of the transmission is transported, for example, to a heat exchanger with the aid of the lubricating oil and is released there to the surrounding environment. In this way, the electrical machine and the transmission are cooled. In this case, a combined cooling and lubricating circuit is provided, with oil as cooling medium and lubricant. This means that the lubricating oil functions not only as a heat transfer medium, but also as a lubricant. The oil then satisfies multiple uses, in that it lubricates and cools the transmission and also cools the electrical machine. This is indeed advantageous, but not imperative. It is also conceivable that separate circuits are provided for lubrication and cooling. However, oil could also be provided as cooling medium for the electrical machine and the transmission in a separate circuit of the transmission.

It is also particularly advantageous if the electrical machine is arranged housing-free (that is to say without its own housing) in a common housing for the electrical machine and the transmission. In other words, the stator laminated core circumferentially borders an interior of the common housing of the gear motor directly (and without a motor housing arranged circumferentially and touching the stator laminated core). In this way, the electrical machine and the gear motor are constructed particularly easily and so as to be lightweight.

It is noted at this juncture that the terms "motor", "motor housing" and "gear motor" within the scope of the invention are used merely for the purpose of providing a simple indication, and do not limit mode of operation of the electrical machine to motor-based operation. Of course, a motor and a gear motor may also be operated in a generator-based mode.

In a further favourable embodiment of the electrical machine, lines or channels for a cooling medium are arranged in the two end shields and are hydraulically connected to the cooling channels in the stator laminated core. A distributor to the cooling channels in the stator laminated core is thus formed in a first end shield and a collector for collecting the cooling medium that has passed through the cooling channels in the stator laminated core and for returning said cooling medium into the return of the circuit is formed in a second end shield.

It is also advantageous, however, if lines or channels for a cooling medium are arranged in the first end shield and are hydraulically connected to the cooling channels in the stator laminated core, and if the cooling channels of the stator laminated core open out in the region of the second end shield into the surrounding environment of the electrical machine. In this variant, a distributor to the cooling channels in the stator laminated core is again provided in a first end shield. However, in the return of the cooling circuit, there is no collector provided, and instead the cooling medium that has passed through the cooling channels in the stator laminated core is released directly into the surrounding environment of the electrical machine, for example into the interior of a housing of a gear motor in which the electrical machine is installed. The cooling circuit can thus be constructed in a particularly simple manner.

It is lastly favourable of the two end shields are connected to the stator with the aid of tie rods. An undesirable movement of the stator laminations away from one another is thus avoided.

The above embodiments and refinements of the invention may be combined in arbitrary fashion.

BRIEF DESCRIPTION OF THE FIGURES

Exemplary embodiments of the invention are shown as examples in the appended schematic figures. The drawings show.

DETAILED DESCRIPTION OF THE INVENTION

Initially, it is stated that identical parts in the different embodiments carry the same reference signs or same component designations, but in some cases with different indices. The disclosures of a component contained in the description may accordingly be transferred to another component with the same reference sign or same component designation. Also, the positional data selected in the description, such as e.g. "top", "bottom", "rear", "front", "side" etc. relate to the figure directly described and depicted, and on a position change, should be transferred accordingly to the new position.

Figure 1:
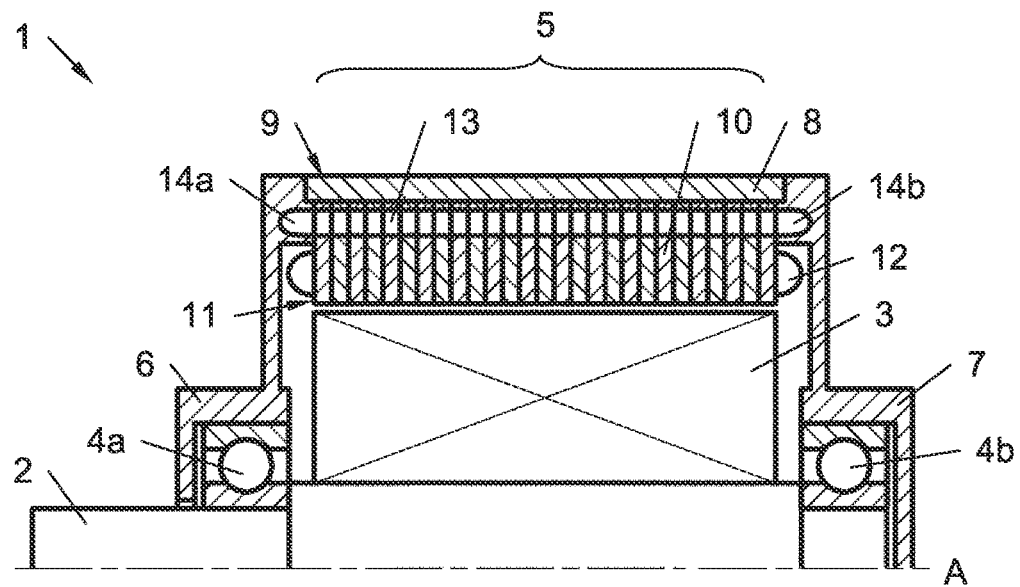
FIG. 1 is a schematic half-sectional view of an exemplary electrical machine.

FIG. 1 shows a half section through a schematically depicted electrical machine 1. The electrical machine 1 comprises a rotor shaft 2 with a rotor 3 (not shown here in detail) sitting thereon, wherein the shaft 2 is mounted by means of (roller) bearings 4a, 4b so as to be rotatable about a rotational axis A relative to a stator 5. In concrete terms, the first bearing 4a sits in a first end shield 6, and the second bearing 4b sits in a second end shield 7. Furthermore, the electrical machine 1a comprises a (middle) housing part 8 which connects the first end shield 6 and the second end shield 7 and receives the stator 5 The first end shield 6, the second end shield 7 and the housing part 8 in this example form the housing 9 of the electrical machine 1a.

The stator 5 has a plurality of stator laminations 10, which form a stator laminated core 11 or a stator main body, as well as stator windings 12 arranged in the stator laminated core 11. Furthermore, the stator 5 comprises a plurality of cooling channels 13 extending in the longitudinal direction of the stator laminated core 11. Furthermore, lines or channels 14a, 14b are arranged in the first end shield 6 and in the second end shield 7 and are hydraulically connected to the cooling channels 13 in the stator laminated core 11.

The cooling channels 13 extending in the stator laminated core 11 as well as the lines or channels 14a, 14b are part of a cooling system (not shown in full in FIG. 1) of the electrical machine 1. The cooling system may in particular also have a pump for a heat transfer medium as well as a heat exchanger (see also FIG. 5 in this regard). For example, a water-glycol mixture circulating in the cooling system or oil can be used as heat transfer medium.

Figure 2:
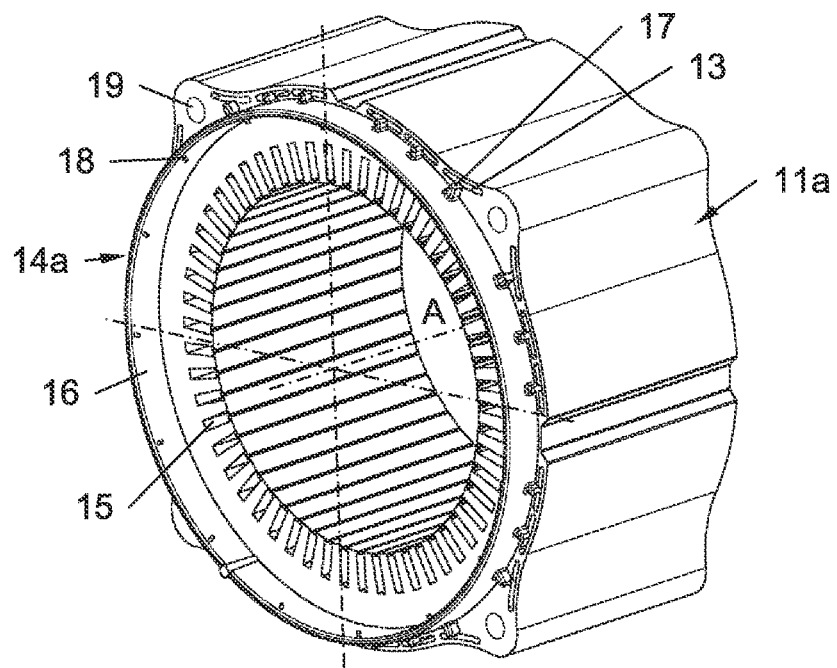
FIG. 2 is a slightly more detailed view of a stator laminated core with a channel of the end shield isolated from the rest of the electrical machine from an oblique perspective.

FIG. 2 now shows a slightly more detailed view of a stator laminated core 11a with a channel 14a isolated from the rest of the electrical machine 1, from an oblique perspective. As can be clearly seen from FIG. 2, the stator laminated core 11a has a plurality of stator winding grooves 15, which receive the stator windings 12. Both the stator winding grooves 15 and the cooling channels 13 extend in the shown example in the axial direction, that is to say parallel to the rotational axis A. The stator winding grooves 15 and the cooling channels 13 could, however, also extend in a skewed manner, that is to say helically, around the rotational axis A.

The channel 14a comprises an annular portion 16, a plurality of splitters 17, which open out into the cooling channels 13 in the stator laminated core 11a, and a plurality of spray nozzles 18 directed towards the stator windings 12.

Figure 3:
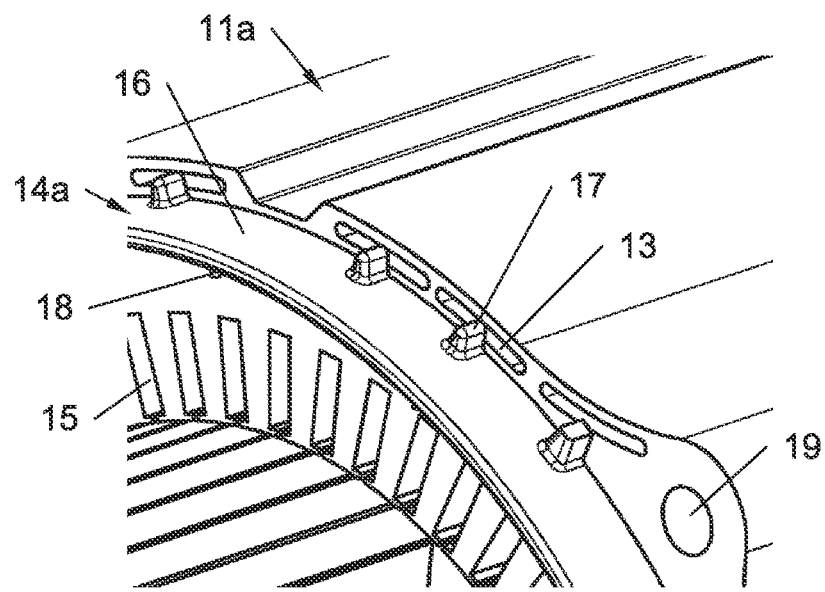
FIG. 3 is an enlarged detail from FIG. 2 in the upper region of the arrangement shown there.

In addition, the stator laminated core 11a comprises a plurality of cut-outs 19 for the tie rods (not shown in FIG. 3).

The cooling channels 13, the stator winding grooves 15 and the cut-outs 19 can be produced, for example, by stamping or cutting corresponding recesses into the individual stator laminations 10a. If the stator laminations 10a are stacked one above the other, the cooling channels 13, the stator winding grooves 15 and the cut-outs 19 are thus created. If the stator laminations 10a are not rotated when they are stacked, axially extending cooling channels 13, stator winding grooves 15 and cut-outs 19 are thus created. If the stator laminations 10a are slightly rotated when they are stacked, a skewed position of the cooling channels 13, the stator winding grooves 15 and the cut-outs 19 is thus created.

Figure 4:
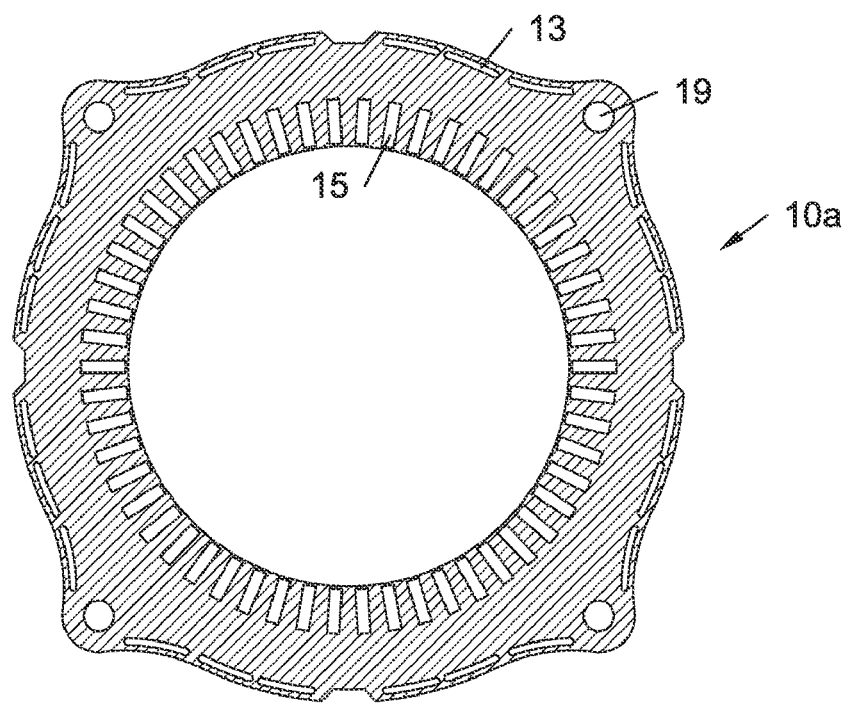
FIG. 4 is a cross-section through a stator lamination.

By way of supplementation, FIG. 3 shows an enlarged detail from FIG. 2 in the upper region of the arrangement shown there, and FIG. 4 shows a cross-section through a stator lamination 10a.

It is noted at this juncture that, for the sake of clear presentation, the channel 14a in FIGS. 2 and 3 is shown without the first end shield 6 delimiting it. In other words, in FIGS. 2 and 3 only the cavity forming the channel 14a in the first end shield 6 is shown. It would also be conceivable that, in the interest of FIGS. 2 and 3, it is assumed that the first end shield 6 is produced from a fully transparent material. In reality, however, it is usually made of a metal.

Figure 5:
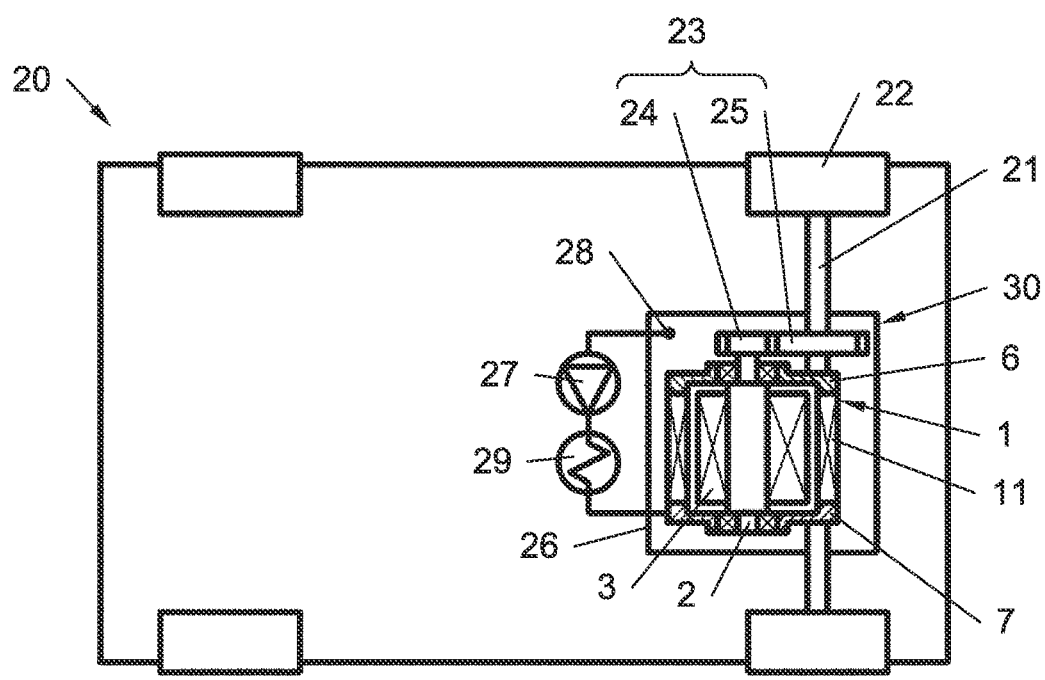
FIG. 5 is a schematic view of a vehicle with an electrical machine of the proposed type.

FIG. 5 finally shows an electrical machine 1 installed in a vehicle 20. The vehicle 20 has at least two axles, at least one of which is driven. The drive of the vehicle 20 is provided at least partially or for part of the time by the electrical machine 1. This means that the electrical machine 1 may serve for solely driving the vehicle 20, or for example may be provided in conjunction with an internal combustion engine (hybrid drive).

In concrete terms, the electrical machine 1 in the shown example is connected via an optional transmission 23 to the half-axle 21 of the rear axle, on which the driven wheels 22 are mounted. The transmission 23 in this example has the motor pinion 24 and the gearwheel 25. However, this is merely illustrative, and the transmission 23 may also be constructed in a more complex manner. In principle, it would also be conceivable that the half-axles 21 or wheels 22 are driven directly, that is to say without transmission 23.

The electrical machine 1 and the transmission 23 are installed here in a common housing 26. The electrical machine 1 in this case too does not have a separate motor housing, that is to say the stator laminated core 11 circumferentially borders an interior of the common housing 26, which also receives the transmission 23, directly (and without a motor housing arranged circumferentially and touching the stator laminated core). In FIG. 5 a pump 27 is also shown, which with the aid of the intake port 28 draws in lubricating oil from the common housing 26 and pumps it via a heat exchanger 29 on the one hand to the electrical machine 1, but on the other hand also to points of the transmission 23 requiring lubrication.

The arrangement coupled to the half-axles 21 thus forms a transmission motor 30, comprising a transmission 23 and an electrical machine 1 coupled to the transmission 23, wherein a lubricating circuit of the transmission 23 is hydraulically connected to the cooling channels 13 of the electrical machine 1.

Waste heat from the electrical machine 1 and also from the transmission 23 is transported to the heat exchanger 28 with the aid of the lubricating oil and is released there to the surrounding environment. In this way, the electrical machine 1 and the transmission 23 are cooled.

In FIG. 5, a combined cooling and lubricating circuit is provided, with oil as cooling medium and lubricant. This means that the lubricating oil functions not only as a heat transfer medium, but also as a lubricant. This is indeed advantageous, but not imperative. It is also conceivable that separate circuits are provided for lubrication and cooling.

In the examples shown in FIGS. 1 to 3, the cooling medium and/or lubricant which has passed through the cooling channels 13 is collected in the second end shield 7 via the channel 14*b* and is then returned into the return of the cooling and/or lubricating circuit. However, it would also be conceivable in principle that the cooling channels 13 of the stator laminated core 11, 11*a* open out in the region of the second end shield 7 into the surrounding environment of the electrical machine 1, in the shown example into the common housing 26.

In the shown examples, the cooling channels 13 are additionally open only at end faces of the stator laminated core 11, 11*a*. However, it would also be conceivable that radially outwardly leading discharge channels are provided in the stator laminated core 11, 11*a* and start from the cooling channels 13.

Finally, it is established that the scope of protection is determined by the patent claims. The description and the drawings should however serve as reference for interpretation of the claims. The features contained in the figures may be interchanged and combined with one another arbitrarily. In particular, it is also established that the devices depicted may in reality comprise more or also fewer constituents than illustrated. In some cases, the illustrated devices or their constituents may also not be depicted to scale, and/or may be enlarged and/or reduced.

What is claimed is:

1. An electrical machine, comprising:
    a first end shield and a second end shield;
    a stator which is arranged between the two end shields and has a stator laminated core and stator windings arranged therein;
    a rotor which is arranged in the stator and has a rotor shaft mounted rotatably in the two end shields;
    cooling channels arranged fully in the stator laminated core and edged by the latter, wherein the cooling channels extend helically around a rotational axis of the rotor shaft; and
    wherein lines or channels for a cooling medium arranged in the two end shields are hydraulically connected to the cooling channels in the stator laminated core through a plurality of splitters.

2. The electrical machine according to claim 1, wherein the cooling channels are open only at end faces of the stator laminated core.

3. The electrical machine according to claim 1, wherein lines or channels for a cooling medium arranged in the first end shield distribute the cooling medium to the cooling channels in the stator laminated core and the cooling channels of the stator laminated core directly release the cooling medium in a region of the second end shield into a surrounding environment of the electrical machine.

4. The electrical machine according to claim 1, wherein the two end are connected to the stator by tie rods.

5. A gear motor, comprising:
    a transmission; and
    an electrical machine according to claim 1 coupled to the transmission,
    wherein a cooling and/or lubricating circuit of the transmission is hydraulically connected to the cooling channels of the electrical machine.

6. The gear motor according to claim 5, wherein the electrical machine is arranged housing-free in a common housing for the electrical machine and the transmission.

7. The gear according to claim 5, wherein oil is provided as cooling medium and/or lubricant in the cooling and/or lubricating circuit of the transmission.

8. A vehicle with at least two axles, wherein at least one is driven, at least partially or for part of a time by the electrical machine as claimed in claim 1.

9. The electrical machine according to claim 1, wherein one of the lines or channels arranged in the first end shield comprises an annular portion, the plurality of splitters, and a plurality of spray nozzles.

10. The electrical machine according to claim 9, wherein the plurality of splitters open out into the cooling channels of the stator laminated core and the plurality of spray nozzles are directed towards the stator windings.

* * * * *